Jan. 20, 1925.
P. C. STICKNEY
EMERGENCY RIM
Original Filed April 5, 1923
1,523,457
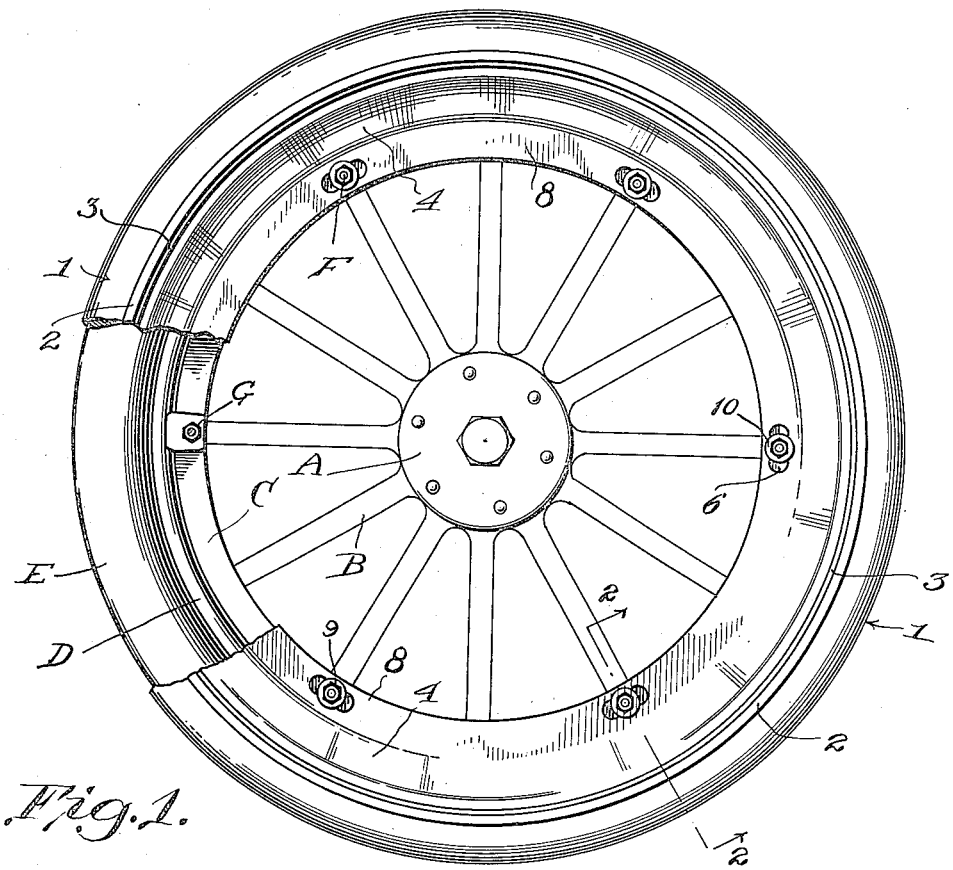
Fig. 1.
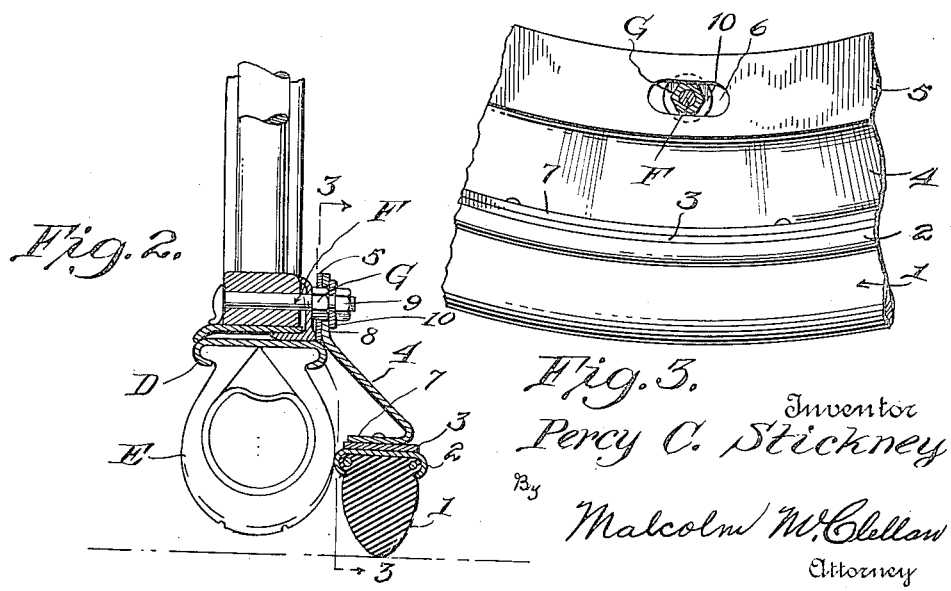
Fig. 2.
Fig. 3.
Inventor
Percy C. Stickney
By Malcolm McClellan
Attorney Patented Jan. 20, 1925.

1,523,457

UNITED STATES PATENT OFFICE.

PERCY C. STICKNEY, OF JACKSONVILLE, FLORIDA.

EMERGENCY RIM.

Application filed April 5, 1923, Serial No. 630,151. Renewed December 5, 1924.

*To all whom it may concern:*

Be it known that I, PERCY C. STICKNEY, a citizen of the United States, residing at Jacksonville, in the county of Duval and State of Florida, have invented certain new and useful Improvements in Emergency Rims, of which the following is a specification.

This invention relates to vehicle wheels, particularly to attachments therefor, and has for its object the provision of an emergency rim and tire designed to be mounted upon the side of an ordinary vehicle wheel in case of deflation of the pneumatic tire thereon, whereby the automobile may be driven upon the emergency rim and tire without it being necessary to remove the deflated tire and without any danger whatever of causing injury thereto.

Another object is the provision of an attachment of this character which is so constructed that it may not only be quickly and easily engaged upon a wheel with the use of ordinary tools but which is also capable of being applied to wheels in which there is, as is generally the case, more or less variation in the exact distance between the demountable rim holding bolts, these bolts being utilized in securing my attachment in place.

An additional object is the provision of a structure of this character which will be simple and inexpensive in manufacture, positive in action, efficient and durable in service, and a general improvement in the art.

With the above and other objects and advantages in view, the invention consists in the details of construction to be hereinafter more fully described and claimed and illustrated in the accompanying drawings in which—

Figure 1 is a side elevation of a wheel equipped with my device, a portion of the attachment being broken away.

Figure 2 is a cross section on the line 2—2 of Figure 1.

Figure 3 is a fragmentary section on a larger scale, the securing bolt being in section, the section being taken on the line 3—3 of Figure 2.

Referring more particularly to the drawings, the letter A designates the hub of a vehicle wheel, from which hub radiate spokes B carrying a felly C on which is mounted the usual demountable rim D carrying a pneumatic tire E and held in place by bolts F which pass through the felly and the lugs and which are equipped with nuts G. This structure is of course old and well known and no claim is made thereto.

In carrying out my invention I provide an emergency rim 2 carrying a cushion tire 1 which has its outside diameter greater than the diameter of the tire E mounted upon the wheel. The rim 2 is stiffened or reinforced by a band 3 which is suitably secured thereto. While it is true that variations in the supporting means for the emergency rim and tire might be resorted to, I prefer to employ a ring member 4 which may conveniently be formed as a sheet-steel stamping or which might, if preferred, be constructed in any other desired specific manner, this particular detail being immaterial. The major portion of this ring is inclined with respect to the plane of the wheel and its outer edge is bent to define a flange 7 which is secured in any desired manner to band 3. The inner portion of the ring 4 is indicated by the numeral 8 and lies in a plane parallel with the plane of the wheel and is disposed against a ring 5 which serves as a stiffener or reinforcement.

In order to secure the attachment upon the wheel, the flange 8 and reinforcement 5 are slotted, as shown at 6, the slots being elongated and being of a width sufficient to receive the nuts G. In actual practice it is probable that the bolts with which the wheel is initially equipped for the purpose of holding the automobile rim retaining lugs will be of insufficient length to permit proper securing of the attachment, for this reason the bolts F shown are of greater length than and replace those ordinarily provided. The attachment is held by other nuts 9 which are screwed upon the extremities of the bolts which project beyond the flange 8, suitable washers 10 being engaged upon the bolts prior to the application of the nuts 9.

In actual practice, whenever it occurs that the tire E becomes deflated, it is merely necessary that the operator jack up or otherwise lift the wheel having the flat tire so as to clear it from the ground to a moderate degree. My attachment is then placed against the wheel with the flange 8 disposed against the lugs in such position that the slots 6 will receive the nuts G. The washers 10 are then applied and the nuts 9 placed in position and screwed down which will hold the attachment rigidly in place upon the wheel and positively prevent any displacement thereof when the vehicle wheel is subsequently lowered to engage the ground. It will be noted that the juncture of the flange 8 with the inclined portion 4 of the rim engages against the flange or bead of the rim D. Owing to the fact that the emergency tire is of greater diameter than the pneumatic tire it is apparent that only the former will roll upon the ground while the latter is held clear thereof and consequently prevented from becoming rim cut or otherwise injured from running in a deflated condition. The provision of the slots 6 is very important as it enables the attachment to be applied to different wheels even though there should be a certain variation in the spacing of the lug bolts, it being well known that it is very unusual for such bolts to be spaced at exactly equal intervals. The device is bound to be not only a saver of tires in case of punctures but is also a great convenience inasmuch as the vehicle may be run safely without it being necessary for the driver to undertake the unpleasant and troublesome operation of changing a tire on the road.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, what I claim as new and desire to secure by Letters-Patent, is:

1. In combination with a vehicle wheel carrying a demountable rim held in place by lugs through which pass clamping bolts equipped with nuts, an emergency rim structure comprising a ring like support carrying a tire of greater diameter than the tire carried by the wheel, said support being formed with openings for the passage of said bolts, and auxiliary nuts on said bolts engaging exteriorly against said support.

2. An emergency rim attachment for vehicle wheels of the type carrying a demountable rim held by lugs secured by means of bolts carrying nuts, comprising a rim carrying a tire of greater diameter than the tire upon the vehicle wheel, a support extending inwardly from said emergency rim and formed with slots for the passage of said bolts and nuts, and other nuts engaged upon the bolts and bearing against said support.

3. An emergency rim attachment for vehicle wheels, comprising a rim carrying a cushion tire of greater diameter than the tire on the wheel, a ring including a flanged outer portion secured upon the inner periphery of said rim, further including an intermediate portion inclined with respect to the plane of the wheel and also including an inner flange, said last named flange being formed with circumferentially elongated slots for the accommodation of the bolts, and nuts holding the lugs which secure the demountable rim of the vehicle wheel, and other nuts on said bolts bearing against said last named flange.

PERCY C. STICKNEY.